| United States Patent [19] | [11] Patent Number: 4,859,895 |
|---|---|
| Morishita et al. | [45] Date of Patent: Aug. 22, 1989 |

[54] ARMATURE COIL SLOTS HAVING GROOVES FORMED IN ITS THROAT

[75] Inventors: Akira Morishita; Keiichi Konishi; Toshinori Tanaka, all of Himeji, Japan

[73] Assignee: Mitsubishi Denk Kabushiki Kaisha, Tokyo, Japan

[21] Appl. No.: 145,043

[22] Filed: Jan. 19, 1988

[30] Foreign Application Priority Data

Jan. 28, 1987 [JP] Japan .................................. 62-11660

[51] Int. Cl.$^4$ .............................................. H02K 1/22
[52] U.S. Cl. ..................................... 310/261; 310/216
[58] Field of Search ......................... 310/195, 214–216, 310/261, 262, 264, 265

[56] References Cited

U.S. PATENT DOCUMENTS

| 1,931,961 | 10/1933 | Kopeliowitsch | 310/264 |
|---|---|---|---|
| 4,147,946 | 4/1979 | Linscott, Jr. et al. | 310/214 |
| 4,473,765 | 9/1984 | Butman, Jr. et al. | 310/215 |
| 4,559,463 | 12/1985 | Kobayashi | 310/261 X |
| 4,572,980 | 2/1986 | Anderson et al. | 310/214 |

FOREIGN PATENT DOCUMENTS

| 3433450 | 3/1986 | Fed. Rep. of Germany | 310/195 |
|---|---|---|---|
| 56-35665 | 8/1981 | Japan | 310/261 |
| 61-221551 | 10/1986 | Japan . | |

Primary Examiner—William M. Shoop, Jr.
Assistant Examiner—Marc S. Hoff
Attorney, Agent, or Firm—Oblon, Spivak, McClelland, Maier & Neustadt

[57] ABSTRACT

An armature for a d. c. motor comprises a shaft, a commutator, a coil and an armature core having a plurality of slots at its circumference to receive the coil. The opening portion of the slots is made smaller than the diameter of a wire constituting the coil, and a groove and a coil constraining portion are formed in a throat portion between the opening portion and a coil receiving portion formed in the slot.

5 Claims, 2 Drawing Sheets

ARMATURE COIL SLOTS HAVING GROOVES FORMED IN ITS THROAT

BACKGROUND OF THE INVENTION

1. Field of the Invention

The present invention relates to an armature. More particularly, it relates to an armature core for the armature.

2. Discussion of Background

FIG. 2 is a front view of a typical armature used for a conventional d.c. motor; FIG. 3 is a cross-sectional view of the armature, and FIG. 4 is an enlarged cross-sectional view partly broken which shows slots formed in the conventional armature.

In these figures, a reference numeral 1 designates a motor shaft. A commutator 2 and an armature core 3 are respectively fitted to the motor shaft 2. An armature coil 4 is fitted in the armature core 3.

As shown in FIG. 4, the shape of the slot of the conventional armature core 3 is constructed in such a manner that the size of an opening portion 5a is made smaller than the diameter of a wire constituting the armature coil 4 to constrain the coil 4 during the revolution of the armature and a magnetic flux formed in association with a field (not shown) is uniform. Heretofore, there has been a demand of manufacturing a motor which allows the output power to be increased without changing the shape of the structural elements for the armature as shown in FIGS. 2-4. In this case, the cost of the armature required for model-changing can be reduced by increasing, for instance, only the diameter of the core and by using the other structural elements as they are. When such measures are taken, the shape of the slot is formed as in FIG. 5, for instance. In FIG. 5, the shape and the dimensions of a coil receiving portion 11b formed in the slot are the same as those of the portion 5b in FIG. 4, and the length of a throat portion formed between the opening portion 11a of the slot and the coil receiving portion 11b is changed from $l_1$ to $l_2$. In this case, the width $b_1$ of the opening portion is not changed so that a magnetic flux formed in association with the field is made uniform.

However, the shape of the slot as shown in FIG. 5 has the following disadvantage. Namely, since the length of the throat portion of the slot is elongated from $l_1$ to $l_2$, the magnetic resistance of this area is lowered (the magnetic resistance is in proportion to the width $b_1$ of the opening portion and is in inverse-proportion of the length $l_2$ of the throat portion provided that the length of the laminated core sheets, i.e. the thickness of the core is unchanged), whereby there is produced a magnetic flux $\Phi_2$ around the slot in addition to the main magnetic flux $\Phi_1$ formed between the armature core and the field. Accordingly, the self-inductance of the coil becomes large to adversely affect current regulation, whereby reduction of output preperties is caused. Further, the intensity of a magnetic field formed in the outer space of the armature core 10 by a magnetomotive force caused by the aramature coil is reduced due to the magnetic flux $\Phi_2$. This adversely affects the generation of torque.

SUMMARY OF THE INVENTION

It is an object of the present invention to provide an armature without causing reduction in an output due to an undesirable magnetic flux formed around the slots in such an armature that the structural elements are to be commonly used and only the diameter of the armature core is changed.

The foregoing and the other objects of the present invention have been attained by providing an armature for a d.c. motor comprising a shaft, a commutator, a coil and an armature core having a plurality of slots at its circumference to receive the coil wherein the opening portion of the slots is made smaller than the diameter of a wire constituting the coil, and a groove and a coil constraining portion are formed in a throat portion between the opening portion and a coil receiving portion formed in the slot.

BRIEF DESCRIPTION OF THE DRAWINGS

°A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
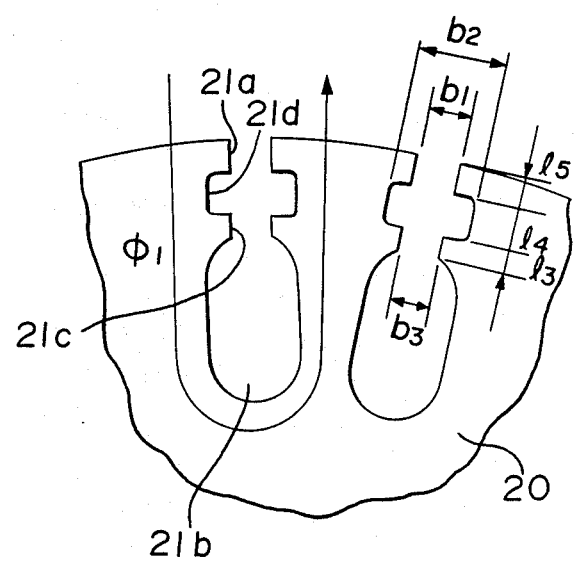
FIG. 1 is a front view partly broken of an embodiment of the armature core according to the present invention.
Figure 2:
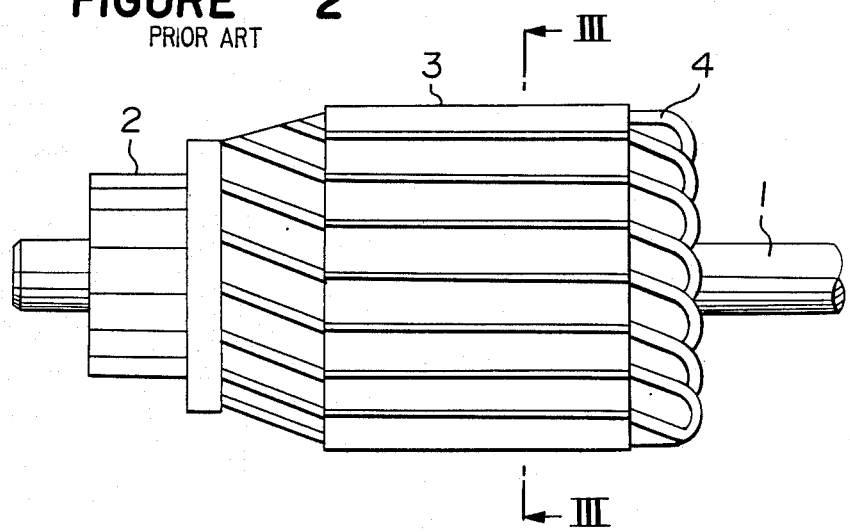
FIG. 2 is a side view showing a conventional armature.
Figure 3:
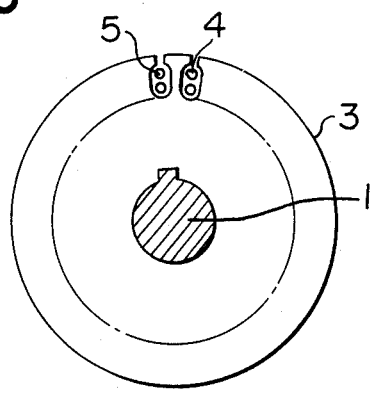
FIG. 3 is a cross-sectional view taken along a line III—III in FIG. 2.
Figure 4:
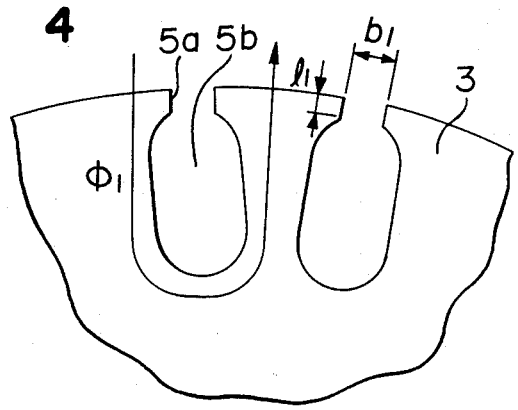
FIG. 4 is an enlarged front view partly broken of slots and the surrounding area.

A preferred embodiment of the present invention will be described with reference to the drawings, wherein the same reference numerals designate the same or corresponding parts.

In FIG. 1, a reference numeral 20 designates an armature core, a numeral 21a designates an opening portion of a slot formed in the armature core, a numeral 21b designates a coil receiving portion formed in the slot, a numeral 21c designates a coil constraining portion and a numeral 21d designates a groove formed in the throat portion between the opening portion 21a and the coil receiving portion 21b.

The throat portion has the same width as the opening portion 21a throughtout its entire length to be communicated with the coil receiving portion 21b and extends along the axial direction of the armature core 20. A pair of the grooves 21d are formed in the throat portion. Namely, the groove 21d is formed in each inner side wall of the throat portion in an opposing relation. The grooves 21d have the same shape and extend along the axial direction of the armature core 20.

The coil constraining portion 21c is defined by the groove and the coil receiving portion 21b at the inner part of the throat portion. Accordingly, the coil constraining portion is paired in an opposing relation in each of the slot and extends along the axial direction of the armature core 20.

Figure 5:
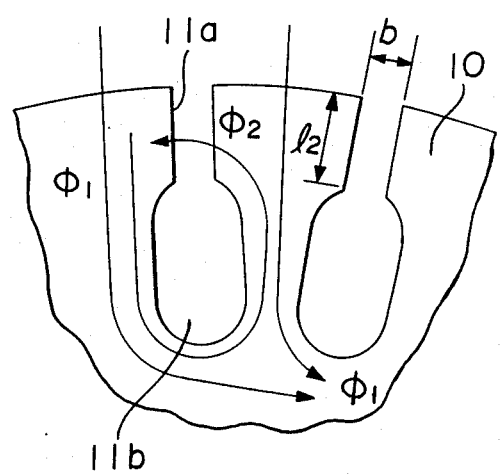
FIG. 5 is an enlarged front view partly broken of slots and the surrounding area of the conventional armature core.

Comparison of the magnetic resistance obtained by the armature of the present invention with that by the conventional armature will be made with reference to FIG. 5. In the conventional armature core, the magnetic resistance $R_1$ in the vicinity of the coil receiving portion is in proportion to the width $b_1$ of the opening portion of the slot, and is in inverse-proportion to the length $l_2$ of the throat portion (provided that the thickness of the armature core (i.e. the length of the laminated core sheet of the armature core, namely the length in the direction perpendicular to the surface of the drawing is unchanged), namely, $R_1 \propto b_1/l_2$.

On the other hand, the magnetic resistance $R_2$ obtained by the armature core of the present invention is represented as $R_2 \propto 1/(l_3/b_3 + l_4/b_2 + l_5/b_1)$ since the magnetic resistance $R_2$ is considered as a combined resistance of the portions of $l_3$, $l_4$ and $l_5$, wherein $l_2 = l_3 + l_4 + l_5$. Accordingly, by suitably selecting the values of $b_2$, $l_3$, $l_4$ and $l_5$, the magnetic resistance can be increased in comparison with that of the armature core having the conventional shape of the slots. Therefore, even in a motor in which the diameter of the armature core is increased while the thickness of the armature core is unchanged, there is obtainable increase in the output by increasing the diameter of the armature core without causing reducting in the output due to a magnetic flux around the slot.

In the above-mentioned embodiment, description has been made as to the grooves having a rectangular shape since use of the rectangular grooves is effective to increase the magnetic resistance. However, the shape of the groove may be a circular or triangular when there is any restriction such as difficulty in machining. In this case, the reduction of the output can be compensated by suitably selecting the size of the other elements, such as the distance $b_2$ between the opposing grooves.

As described above, in accordance with the present invention, the output of the motor can be increased by increasing only the diameter of the armature core while the structural elements other than the armature core are unchanged and are commonly used. Accordingly, the cost of manufacturing the motor can be decreased when model change of the motor has to be done. Also, the motor having a small loss of output can be obtained since the armature core has a shape to increase a magnetic resistance around the slot.

Obviously, numerous modifications and variations of the present invention are possible in light of the above teachings. It is therefore to be understood that within the scope of the appended claims, the invention may be practiced otherwise than as specifically described herein.

What is claimed is:

1. An armature for a d.c. motor comprising a shaft, a commutator, a coil and an armature core haivng a plurality of slots at its circumference to receive said coil wherein the opening portion of said slots is made smaller than the diameter of a wire constituting said coil, and a groove and a coil constraining portion are formed in a throat portion between said opening portion and a coil receiving portion formed in said slot, said throat portion having a constant width and extending along the axial direction of the armature core in which said groove is formed in each inner side wall of said throat portion in an opposing relation, so as to have an increased magnetic resistance compared to an armature without said groove.

2. The armature according to claim 1, wherein the magnetic resistance is proportional to $1/(l_3/b_3 + l_4/b_2 + l_5/b_1)$ where $l_3$ is the radial dimension of the throat between the coil receiving portion and the groove, $l_4$ is the radial dimension of the groove, $l_5$ is the radial dimension of the throat between the groove and the opening portion, $b_3$ is the width of the throat at the coil receiving portion, $b_2$ is the width of the throat including the groove and $b_1$ is the width of the throat at the opening portion.

3. The armature according to claim 1, wherein said grooves have the same shape and extend along the axial direction of said armature core.

4. The armature according to claim 1, wherein said coil constraining portion is defined by said groove and said coil receiving part at the inner end of said throat portion.

5. The armature according to claim 4, wherein said coil constraining portion extends along the axial direction of said armature core.

* * * * *

UNITED STATES PATENT AND TRADEMARK OFFICE
CERTIFICATE OF CORRECTION

PATENT NO. : 4,859,895

DATED : Aug. 22, 1989

INVENTOR(S) : AKIRA MORISHITA, ET AL

It is certified that error appears in the above-identified patent and that said Letters Patent is hereby corrected as shown below:

On the title page:

The Assignee has been misspelled "Mitsubishi Denk Kabushiki Kaisha" should be:

--Mitsubishi Denki Kabushiki Kaisha--

Signed and Sealed this

Third Day of April, 1990

*Attest:*

HARRY F. MANBECK, JR.

*Attesting Officer*  *Commissioner of Patents and Trademarks*